United States Patent
Colavin et al.

(10) Patent No.: US 8,099,585 B2
(45) Date of Patent: *Jan. 17, 2012

(54) PREDICATED EXECUTION USING OPERAND PREDICATES

(75) Inventors: Osvaldo Colavin, San Diego, CA (US); Davide Rizzo, San Diego, CA (US)

(73) Assignee: STMicroelectronics, Inc., Carrollton, TX (US)

( * ) Notice: Subject to any disclaimer, the term of this patent is extended or adjusted under 35 U.S.C. 154(b) by 47 days.

This patent is subject to a terminal disclaimer.

(21) Appl. No.: 11/891,294

(22) Filed: Aug. 9, 2007

(65) Prior Publication Data

US 2008/0040586 A1 Feb. 14, 2008

Related U.S. Application Data

(63) Continuation of application No. 10/283,709, filed on Oct. 30, 2002, now Pat. No. 7,269,719.

(51) Int. Cl.
*G06F 9/00* (2006.01)
(52) U.S. Cl. ...................................................... 712/226
(58) Field of Classification Search .................... 712/226
See application file for complete search history.

(56) References Cited

U.S. PATENT DOCUMENTS

| | | | | |
|---|---|---|---|---|
| 4,766,564 A * | 8/1988 | DeGroot | ........................ | 708/507 |
| 4,910,656 A * | 3/1990 | Scales et al. | ................... | 711/144 |
| 5,185,878 A * | 2/1993 | Baror et al. | ..................... | 711/123 |
| 5,542,075 A * | 7/1996 | Ebcioglu et al. | ............... | 717/151 |
| 5,625,835 A * | 4/1997 | Ebcioglu et al. | ................. | 712/23 |
| 5,752,070 A | 5/1998 | Martin et al. | | |
| 5,815,420 A * | 9/1998 | Steiss | ............................. | 708/524 |
| 5,881,305 A * | 3/1999 | Walker | ............................ | 712/23 |
| 6,073,159 A * | 6/2000 | Emer et al. | .................... | 718/103 |
| 6,112,019 A * | 8/2000 | Chamdani et al. | ............ | 712/214 |
| 6,138,230 A * | 10/2000 | Hervin et al. | .................. | 712/216 |
| 6,260,190 B1 * | 7/2001 | Ju | ................................... | 717/156 |
| 6,286,135 B1 * | 9/2001 | Santhanam | .................... | 717/146 |
| 6,530,012 B1 | 3/2003 | Wilson | | |
| 6,643,767 B1 * | 11/2003 | Sato | .............................. | 712/219 |
| 6,898,787 B2 | 5/2005 | Thompson et al. | | |
| 6,996,557 B1 * | 2/2006 | Leung et al. | ...................... | 707/4 |

(Continued)

OTHER PUBLICATIONS

"An Architecture Framework for Introducing Predicated Execution into Embedded Microprocessors" Daniel A. Connors, Jean-Michel Puiatti, David I. August, Kevin M. Crozier, and Wen-mei W. Hwu; Proceedings of the Fifth European Conference on Parallel Processing (EUROPAR), Sep. 1999.*
"Predicate Prediction for Efficient Out-of-order Execution"; Weihaw Chuang and Brad Calder; In the proceedings of the 17th Annual ACM International Conference on Supercomputing, Jun. 2003.*
"Using Predicated Execution to Improve the Performance of a Dynamically Scheduled Machine with Speculative Execution"; Chang, Po-yung and Hao, Eric and Patt, Yale N. and Chang, Pohua P. (1995) In PACT.*

(Continued)

*Primary Examiner* — Idriss N Alrobaye
(74) *Attorney, Agent, or Firm* — Lisa K. Jorgenson

(57) ABSTRACT

Full predication of instruction execution is provided by operand predicates, where each operand has an associated predicate bit intuitively indicating the validity of the operand value. In a programmable processor supporting operand predication, an instruction will execute only if the predicate bit of every register containing a source operand is true. The predicate bit, if any, of the destination register is set to the logical AND of the source registers' predicates. Similarly, in a non-programmable processor synthesized with predicated operand support, an operator will perform the associated function depending on the state of inputs' predicates. The output predicate is evaluated as the logical AND of the inputs' predicates. An additional bit for each data register, a change in the semantics of the instructions to include predication, and a few additional instructions to save and restore register predicate bits and to specifically set or reset a register's predicate bit are required.

20 Claims, 2 Drawing Sheets

U.S. PATENT DOCUMENTS

| | | | |
|---|---|---|---|
| 2001/0010073 A1* | 7/2001 | Janik et al. | 712/218 |
| 2002/0066090 A1* | 5/2002 | Babaian et al. | 717/156 |
| 2002/0087847 A1* | 7/2002 | Kling et al. | 712/233 |
| 2002/0112148 A1 | 8/2002 | Wang et al. | |
| 2002/0156997 A1* | 10/2002 | Farrell et al. | 712/217 |
| 2003/0088759 A1* | 5/2003 | Wilkerson | 712/218 |
| 2004/0015919 A1* | 1/2004 | Thompson et al. | 717/152 |

OTHER PUBLICATIONS

Perry H. Wang et al., "Register Renaming and Scheduling for Dynamic Execution of Predicated Code," 2001 IEEE, pp. 15-25.

Dezso Sima et al., "Advanced Computer Architectures, A Design Space Approach," 1997, 11 pages.

* cited by examiner

PREDICATED EXECUTION USING OPERAND PREDICATES

This application is a continuation of U.S. patent application Ser. No. 10/283,709, filed Oct. 30, 2002 now U.S. Pat. No. 7,269719 and entitled "PREDICATED EXECUTION USING OPERAND PREDICATES". U.S. patent application Ser. No. 10/283,709 is assigned to the assignee of the present application and is incorporated by reference into this disclosure as if fully set forth herein. This disclosure hereby claims priority under 35 U.S.C. § 120 to U.S. patent application Ser. No. 10/283,709.

TECHNICAL FIELD OF THE INVENTION

The present invention is directed, in general, to predication of processor instructions and, more specifically, to architectural support for predicated execution in programmable or non-programmable processors.

BACKGROUND OF THE INVENTION

Predication (also referred to as "guarding") of instruction execution within a processor is typically used in the context of two distinct compiler techniques:

- if-conversion is a transformation converting control flow into data flow, in which predication is used to speculatively execute non-taken branches of a control flow graph, providing fewer branches and more instruction level parallelism (ILP) opportunities; and
- software pipelining is a loop transformation that creates a periodic schedule for overlapped execution of successive iterations (a pipeline), allowing the same schedule for the filling ("prologue") or emptying ("epilogue") of the pipeline in a technique referred to as kernel-only scheduling, providing smaller code.

These techniques are used in compilers to generate code for programmable processors, as well as in high level synthesis (HLS) tools to generate non-programmable processors from high-level description languages such as very high speed integrated circuit (VHSIC) hardware-level description language (VDHL) or C.

Instruction set architectures (ISAs) support predicated execution either fully or partially. ISAs with full predicated execution support provide a way to prevent issued instructions from modifying the architectural state. This is achieved with a specific predicate register file, a specific set of instructions to write results of comparisons to there registers, and an additional predicate operand to most instructions conditioning the commitment of the result of the destination register. The instruction format provides room for three source operands, and this implementation of full predication is called instruction predication.

ISAs with partial predicated execution support emulate predication with ordinary non-predicated instructions and a way to conditionally copy one register to another. In most implementations, a conditional move instruction (e.g., "cmove") is provided to conditionally copy one source operand to the destination depending on the value of a second source operand (the predicate or guard condition). Another implementation uses a selection instruction (e.g., "select") with three source operands, copying one of two source operands to the destination based on the value of the third source operand (the predicate).

The two approaches to predicated execution are closely related since full predication support effectively combines an implicit conditional move instruction with every predicated instruction. However, full predication support offers the most benefits in terms of performance (number of cycles, code size, resource usage), but instruction predication requires that predication be designed in the ISA from the ground up, essentially because room must be made for an additional source operand (the predicate) in the instruction format. Therefore existing ISAs without full predication support—typically using a three operand instruction format (one destination and two sources)—cannot be extended to support full predication.

On the other hand, in ISAs with full predication support the predicate operand field constitutes a non-negligible portion of the code size. For example, if a 32-bit ISA defines sixteen predicate registers, the predicate operand field represents as much as 12.5% of the memory footprint of a program.

Unlike full predication support, partial predication support may be readily added to existing ISAs since only the addition of at least one instruction is required. The downside is that partial predication support is not as effective as full predication support, resulting in larger code and higher resource usage as illustrated by the if-conversion code example in TABLE I:

TABLE I

| Original Code | Predicated Low-Level Code With Full Support | | Predicated Low-Level Code With Partial Support |
|---|---|---|---|
| z=... | z=... | | z=... |
| if (i<0) { | p1 = (i<0); | | p1 = (i<0); |
|   x=0; | x = 0 | if p1; | x1 = 0; |
|   y=0; | y = 0 | if p1; | y1 = 0; |
| } else { | p2 = (i>=0); | | p2 = (i>=0); |
|   x=A[i]; | x = *(A+i) | if p2; | tmp1 = A+i; |
|   x=x*i; | x = x*i | if p2; | tmp1 = cmove(safe_addr,p1); |
|   y=y+x; | y = y+x | if p2; | x2 = *tmp1; |
|   z=y>>1; | z = y>>1 | if p2; | x3 = x2*i; |
|   B[i]=y; | *(B+i) = y | if p2; | y2 = y+x3; |
| } | | | z2 = y2>>1; |
| | | | tmp2 = B+i; |
| | | | tmp2 = cmove(safe_addr,p1); |
| | | | *tmp2 = y2; |
| | | | x = cmove(x1,p1); |
| | | | x = cmove(x3,p2); |
| | | | y = cmove(y1,p1); |
| | | | y = cmove(y2,p2); |
| | | | z = cmove(z2,p2); |

As immediately observable from TABLE I, partial predication support requires significant code expansion because of the addition of conditional move instructions and the care which must be taken to avoid illegal memory accesses.

Also apparent for TABLE I is that predication adds explicit dependence edges in the original program data flow graph. These edges go from the predicate definition (p1 and p2) to use of the predicate in the predicated instructions (for full support) or to the inserted conditional move instruction (for partial support). These additional dependence edges can negatively affect the effectiveness of the code generated by a compiler.

The negative impact of predication is particularly evident for the software pipelining of loops in the case where the target machine supports full predication but not rotating registers. In this situation, an iteration predicate is computed for each iteration, and each instruction of the loop body is guarded by the iteration predicate to enable the execution of the prologue and epilogue of the loop with the same code as the kernel. Therefore the iteration predicate is live across all of the stages of the iteration. Moreover, since no rotating registers are present, the kernel of the loop must be unrolled a number of times equal to the number of stages of the schedule, which is actually a worst case. Without the constraint imposed by this implementation of predication, the number of unrolls and the resulting code expansion can be reduced.

There is, therefore, a need in the art for an implementation of full predication realized by simple extension of an existing ISA having no built-in full predication support, to achieve the benefits of full predication within this class of ISAs. There is also a need to reduce the number of data dependencies introduced in the program data flow graph by predication so as to enable the compiler to generate more efficient code, or more efficient hardware.

SUMMARY OF THE INVENTION

To address the above-discussed deficiencies of the prior art, it is a primary object of the present invention to provide, for use in a processor, full predication of instruction execution through operand predicates, where each operand has an associated predicate bit intuitively indicating the validity of the operand value. In a programmable processor supporting operand predication, an instruction will execute only if the predicate bit of every register containing a source operand is true. The predicate bit of the destination register, if any, is set to the logical AND of the source registers' predicates. Similarly, in a non-programmable processor synthesized with predicated operand support, an operator will perform the associated function depending on the state of inputs' predicates. The output predicate is evaluated as the logical AND of the inputs' predicates. An additional bit for each data register, a change in the semantics of the instructions to include predication, and a few additional instructions to save and restore register predicate bits and to specifically set or reset a register's predicate bit are required.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art will appreciate that they may readily use the conception and the specific embodiment disclosed as a basis for modifying or designing other structures for carrying out the same purposes of the present invention. Those skilled in the art will also realize that such equivalent constructions do not depart from the spirit and scope of the invention in its broadest form.

Before undertaking the DETAILED DESCRIPTION OF THE INVENTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

FIGS. 1 through 4A-4B, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged device.

Figure 1:
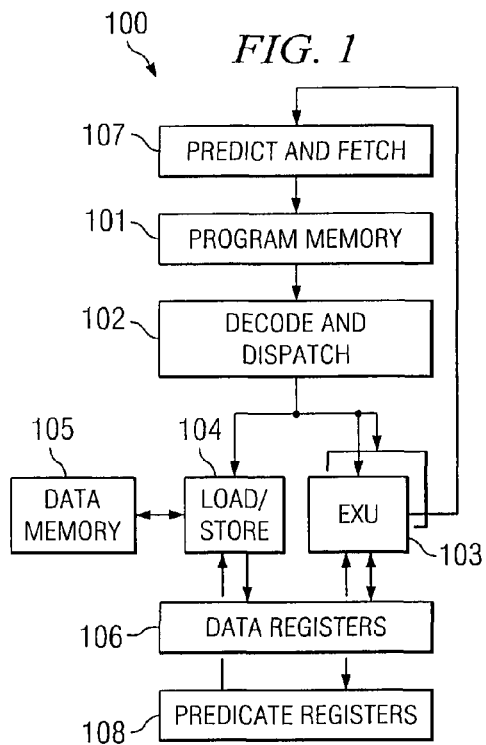
FIG. 1 depicts a processor employing operand predicates according to one embodiment of the present invention.

FIG. 1 depicts a processor employing operand predicates according to one embodiment of the present invention. Processor 100 comprises a core including: a program memory 101 containing program instructions for execution; a decode and dispatch unit 102 decoding instructions and dispatching the decoded instructions for execution; at least one execution unit 103 executing computational instructions and a load/store unit 104 executing data access instructions; a data memory 105 containing operands copied to/from data registers 106; and a predict and fetch unit 107 causing instructions from program memory 101 to be sent to decode and dispatch unit 102. In addition, processor 100 includes predicate registers 108 containing operand predicates that may be read from and written to by execution unit(s) 103 and read from by load/store unit 104. Predicate registers 108 are employed in implementing operand predication as described in further detail below.

Those skilled in the art will recognize that the full construction and operation of a processor is not described herein or depicted in the drawings. Instead, for simplicity and clarity, only so much of the construction and operation of a processor as is unique to the present invention or necessary for an understanding of the present invention is depicted and described.

Figure 2:
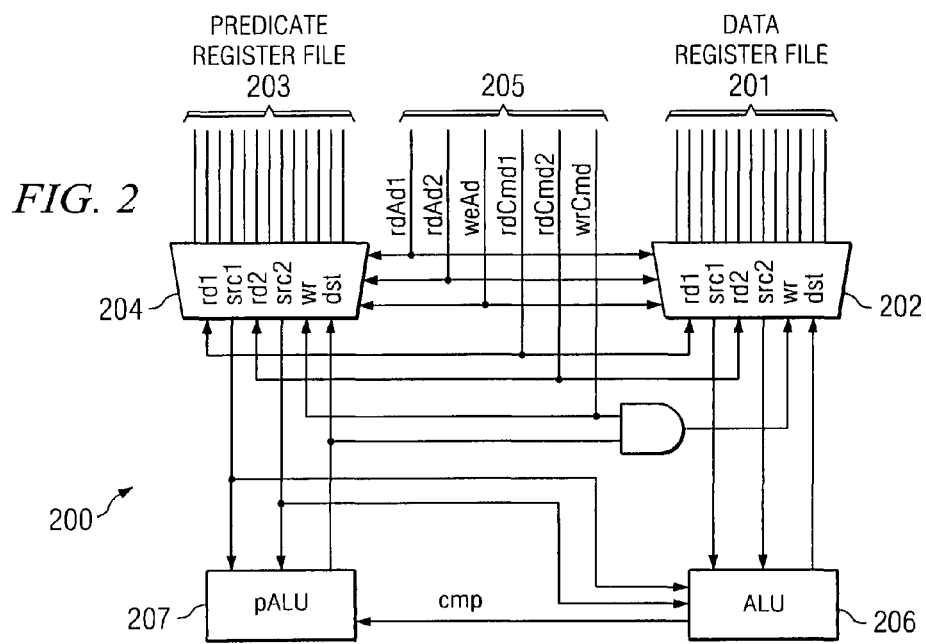
FIG. 2 is a diagram of a control mechanism implementing operand predication within a processor according to one embodiment of the present invention.

FIG. 2 is a diagram of a control mechanism implementing operand predication within a processor according to one embodiment of the present invention. Control mechanism 200 is implemented within processor 100 depicted in FIG. 1 and is based on a simple one-issue processor supporting operand predication, which includes a data register file (DRF) 201 (within data registers 106) with associated selection mechanism 202, a predicate register file (PRF) 203 (within predicate registers 108) with associated selection mechanism 204, and control signals 205. Data register file 201 stores a number of machine word size data, while predicate register file 203 contains a corresponding number of one-bit predicates. An alternative implementation with a single register file of machine word size data plus one-bit registers (illustrated by dashed lines) is also possible. However, use of two physically distinct register files 201 and 203 is preferred since (1) the write command is distinct between the two register files (or file portions) and (2) the predicate register file can be manipulated as a whole for faster operation during, for example, context save and restore.

Consistent with the premise of a one-issued width processor and assuming that the ISA has a three operand format with two source operand registers and one destination operand register, each register file 201 and 203 has two read ports src1 and src2 and one write port dst. Each port is controlled by an address bus (rdAd1 for port src1, rdAd2 for port src2, and wrAd for port dst) and a read or write command signal (rdCmd1 for port src1, rdCmd2 for port src2, and wrCmd for port dst), depending on the nature of the port. Both register files 201 and 203 share the same address buses and read command signals, but not the same write command signal, which differs for each register file 201 and 203. In a multiple issue processor, the register files may have additional read and write ports and may share all addresses busses and all read command signals, but not the various write command signals.

Although different, the write command signals to both register files 201 and 203 are correlated. The data register file 201 is written to only when the predicate register file 203 is written to and the predicate of the result is true (as symbolized by the AND gate in FIG. 2). Although in theory the write signal to the data register file need not be conditioned by the result predicate (after all, if a result is invalid as indicated by a false predicate, the value of that result is irrelevant), such conditioning saves power by avoiding unnecessary writes to the data register file 201.

Control mechanism 200 is coupled to at least one arithmetic logic unit 206 as expected, but also includes a predicate arithmetic logic unit (pALU) 207 for computing predicates. ALU 206 is of a typical design, with additional logic to implement conditional move and phi instructions described below, for which the ALU 206 requires access to the operand predicates as illustrated in FIG. 2. Essentially these instructions route one of two source operands to the destination operand based on the source operands' predicate values.

The pALU 207 computes result predicates based on the instruction type, the predicates of the source operands and the result of a comparison performed in the ALU 206 as described below, where the result is transmitted by compare signal cmp. For most instructions, the predicate of the result is simply the logical AND of the source operands' predicates. When one of the source operands is an immediate value (e.g., a constant encoded into the instruction itself), that operand's predicate is implicit and always true. For a phi instruction, the predicate of the result is the exclusive OR (XOR) of the source operands' predicates. For a comparison instruction, the predicate of the result is a logical combination of the comparison result from the ALU 206 and the source operands' predicates, as defined by the instruction-specific semantics.

For simplicity, the exemplary embodiment does not consider a pipelined processor, but may be readily extended for pipelined operation. In a pipelining context, further opportunities for optimizations are possible. For example, the predicate register file may be read and the predicate of the result computed during an early stage of the pipeline, allowing the ALU 206 to enter a low power mode for the rest of the pipeline if the instruction results may be discarded.

Under operand predication semantics according to the present invention, an instruction executes only if all of the predicates for the source operands of the instruction are true. However, an instruction always sets the destination operand predicate to the logical AND of the predicates of the instruction source operands, reminiscent of the dataflow paradigm.

Formally, the semantic of operand predication is the following:

dst=opcode(src1,src2)

which is equivalent to:

dst=opcode(src1, src2) if (src1.p && src2.p)

dst.p=src1.p && src2.p where ".p" is the predicate bit of the respective operand. Memory and branch instructions are similarly predicated. In particular, a store will write to memory only if the source operand predicates are true, and a branch will change the flow of control only if the predicate is true. Since a destination register is always modified, instructions for which a predicate is false should not be squashed, but should be allowed to update the predicate of the destination register.

An example of operand predicated code is given below in TABLE II:

TABLE II

| Original Code | SSA Transformed Code | Operand Predicated Code |
|---|---|---|
| z=... | z=... | z=... |
| if (i<0) { | if (i<0) { | x1 = 0; |
| x=0; | x1=0; | x1.p = (i<0); |
| y=0; | y1=0; | y1 = 0; |
| } else { | z1=z; | y1.p = (i<0); |
| x=A[i]; | } else { | z1 = 0; |
| x=x*i; | x2=A[i]; | z1.p = (i<0); |
| y=y+x; | x3=x2*i; | i1 = i; |
| z=y>>1; | y2=y+x3; | i1.p = (i>=0); |
| B[i]=y; | z2=y2>>1; | x2 = *(A+i1); |
| } | } | x3 = x2*i1; |
|  | x=ø(x1,x3) | y2 = y+x3; |
|  | y=ø(y1,y2) | z2 = y2>>1; |
|  | z=ø(z1,z2) | *(B+i1) = y2; |
|  |  | x = phi(x1,x3); |
|  |  | y = phi(y1,y2); |
|  |  | z = phi(z1,z2); |

As illustrated in TABLE II, the first step in deriving operand predicated code consists of applying the single static assessment (SSA) transformation known in the art to the original code. Briefly, variables assigned in mutually exclusive control paths are duplicated and the various values reconciled at the control merge point with phi (ϕ) functions, allowing all branches to be evaluated in parallel, all but one speculatively.

The second step in deriving operand predicated code consists of applying an if-conversion to the transform control flow into data flow. A predicate is defined for each control path and attached to a minimum set of variables such that the predicate propagates down the data flow graph of the control path during execution. The minimum set of variables selected is a subset of the dependence set for the roots of the data flow graph of the control path under consideration. In essence, this transformation creates implicit dependencies between the predicate and all the instructions of the control path, reusing the existing data dependence graph rather than creating explicit dependencies.

In the example of TABLE II, x1, y1 and z1 act as predicated of the true control path and i1 acts as the predicate of the false control path. By virtue of their dependence on i1, the predicates of x2, x3 y2 and z2 need not be set explicitly, and the memory accesses to arrays A and B will occur only if the predicate of i1 is true.

The phi instruction implements exactly the two-way φ function of SSA transformation and is an alternative to the conditional move instruction cmove. The predication scheme for the phi instruction differs from that of other instructions as described above.

Similar to partial predication support, operand predication increases register pressure. However, operand predication does not increase code size as much as partial predication support, particularly for predication of memory accesses. Moreover, a number of optimizations are known in the art that mitigate the drawbacks of SSA transformation. Other optimizations specific to operand predication may be developed. For instance, an instruction with two source operands may be predicated based on only one of the source operands.

Architectural support for operand predication within the processor 101 requires addition of one predicate bit to (or associated with) each register. Proposals for sentinel scheduling have suggested the addition of a bit to each register, but for totally different purposes—that of managing exceptions during speculative execution. Proposals regarding predication have been concentrated around predicating instructions rather than predicating operands. As noted above, the preferred implementation uses a separate set of register files, one for each operand register, to hold all predicate bits.

Architectural support for operand predication also requires hardware to implement the semantic of operand predicated execution—that is, compute the predicate bit of an instruction result and prevent the commitment of instructions when the result predicate is false. This requires a way to dynamically decide whether an instruction should be allowed to modify the state of a hardware register. The operand predicate model also requires logic to compute the predicate bit of the destination register, although the amount of logic required is negligible.

Instructions to set the predicate bit of a register with the result of a comparison are also required for operand predication. The minimum requirement is one instruction that copies a Boolean value stored in a branch or general purpose register into the predicate bit of a destination register. However, since predicate definition is one of the performance bottlenecks in architectures supporting predication, a preferred implementation supports a set of comparison instructions writing a Boolean result directly into the predicate bit of a destination register, leaving the register (operand) value unchanged. Formally:
dst=<cmp>p(src1,src2)
is equivalent to:
dst=dst
dst.p=(src1 <cmp> src2) && (src1.p && src2.p)
which is a definition corresponding to an unconditional predicate assignment semantic.

Furthermore, predicate definition may be augmented by adding an OR and an AND semantic to predicate assignments, which is useful to accelerate compounded predicate definitions. For example, the semantic of an OR type predicate assignment is:
dst=<cmp>$P_{OR}$(src1,src2)
which is equivalent to:
dst=dst
dst.p=((src1 <cmp> src2)||dst.p) if (src1.p && src2.p)

Instructions to implement, or at least emulate, the φ function of SSA transformation are also required. As illustrated above, SSA code transformation is used before predication, and introduces calls to the φ function at control merge points. The semantic of the φ function must therefore be supported. In ISAs with partial predication support, an N-way φ function is typically emulated with N conditional move instructions. In ISAs with full predication support using instruction predication, the φ function is implicitly executed when several instructions with exclusive predicates write to the same register. Phrased differently, a predicated instruction implicitly executes a conditional move.

Conditional moves may also be used with operand predication, with the following semantic:
dst=cmove(src1)
which is equivalent to:
dst=src1 if src.p
dst.p=1 if src1.p
However, operand predication actually allows a direct implementation of the two-way φ function with the phi instruction. The semantic of the phi instruction is different from that of other instructions, since the phi instruction will copy to a destination register the one of two source operands having a true predicate. If all source operand predicates are false, which occurs when the merge point at which the phi instruction is located forms part of a not-taken control path, the destination register is not modified. Formally:
dst=phi(src1, src2)
is equivalent to:
dst=src1.p?src1:scr2 if (src1.p^src2.p)
dst.p=1 if src1.p^src2.p
where ^ represents a logical exclusive-OR (XOR) operation. An alternate definition of the phi instruction is described below.

Instructions to save and restore the register predicate bits with the register values are also required. When registers are saved individually (spills), the associated predicate bit must be saved along with the register contents. One option is to provide a specific spill instruction that uses two words of memory to save the register value and the associated predicate bit. Another option is to provide a mechanism for saving and restoring the predicate register and a mask with machine word granularity.

Figure 3A:
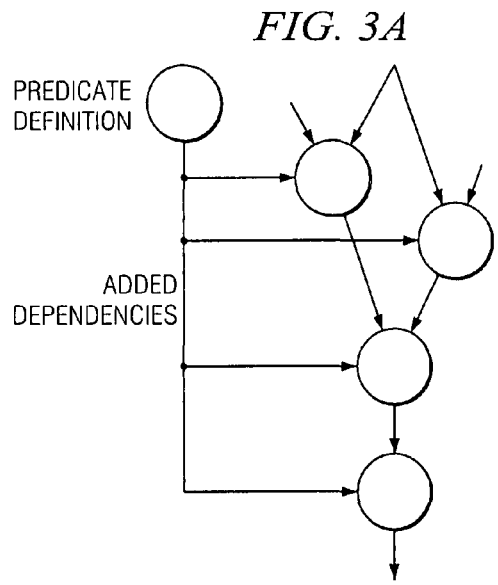
FIGS. 3A-3B are comparative diagrams of additional data dependencies added with instruction predication according to the known art and with operand predication, according to one embodiment of the present invention.
Figure 3B:
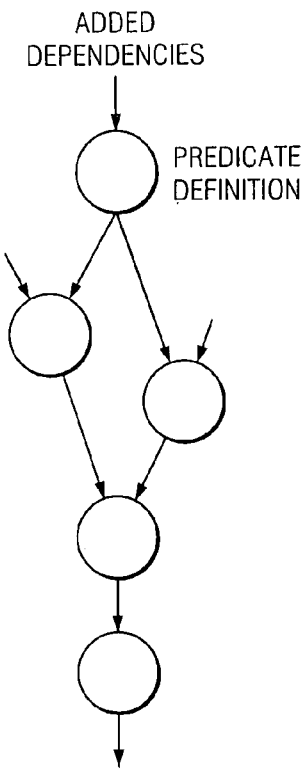

FIGS. 3A and 3B are comparative diagrams of additional data dependencies added with instruction predication according to the known art and with operand predication according to one embodiment of the present invention. As described earlier, instruction predication introduces additional data dependencies in the data flow graph of a loop body as illustrated in FIG. 3A, leading to a worst case kernel unroll factor in the case where there is no support for rotating registers. Operand predication works around this pitfall because the explicit dependencies to the predicate are limited to a small set of instructions. The dependencies between the predicate and the other instructions exist, but are implicit and flow along the existing data dependencies as illustrated in FIG. 3B. This property is particularly beneficial in the case of software pipelining of loops because, in the course of transformation, every instruction is predicated with the iteration predicate, leading to a number of added data dependencies equal to the number of instructions in the loop body, which can be fairly large.

Figure 4A:
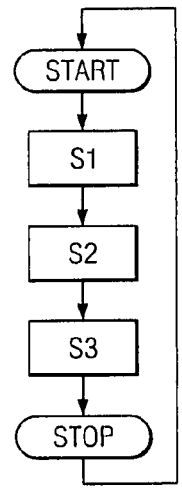
FIGS. 4A and 4B are comparative diagrams of control flow graphs of a loop with and without software pipelining, respectively.
Figure 4B:
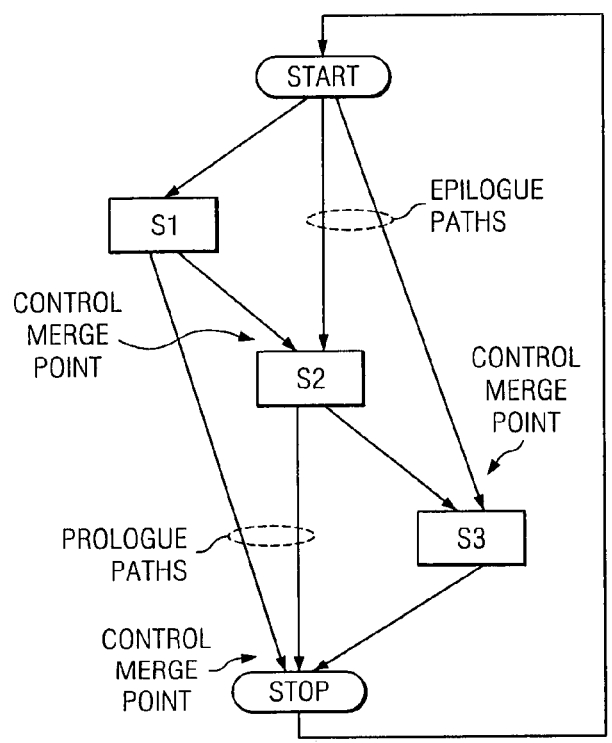

FIGS. 4A and 4B are comparative diagrams of control flow graphs of a loop with and without software pipelining, respectively. Software pipelining with predication support introduces extra control paths in the loop body because the prologue, kernel and epilogue are executed with the same code. The control flows between pipeline stages S1, S2 and S3 depicted in FIG. 4B are created during software pipelining. During the prologue phase of the loop, execution control flow never reaches stage S3. Similarly, during epilogue execution, control never flows through stage S1. During kernel execution, control flow goes through all stages S1, S2 and S3.

No φ functions are required at the control merge points since there are no variables assigned exclusive values along the various control paths, which results from the way the pipeline schedule is built, in particular the way overlapping variable lifetimes are solved with rotating registers or kernel unrolling. The operand predicate approach to full predication thus eliminates an undesirable side effect of predication, the addition of many phi instructions. However, other phi instructions might be present in the schedule of the software-pipelined loop due to the if-conversion transformation applied to the loop body prior to pipeline scheduling.

A compiler will be able to further optimize operand predicated code if a semantic is provided instructions, where only one operand is considered for determination of the instruction's predicate (or, stated another way, where the predicate for the other operand is always true). Formally:
dst=opcode(src1, src2)
is equivalent to:
dst=opcode(src1,src2) if src1.p
dst.p=src1.p This can be achieved in one of two ways: provide encoding space within the instruction format to indicate which predication semantic is in order; or provide a sub-set of registers for which the predicate is always true. This feature is particularly useful in the case of recurrences in the modulo schedule of loops.

The case where more than one source predicate to a phi instruction is true should never occur since merging control paths are mutually exclusive. However, this circumstance may be allowed as a side effect of a compiler optimization, in which case a priority scheme should be added to the semantic of the phi instruction, such as the following, where src1 is selected over src2 in case the predicates of both are true:
dst=phi(src1, src2)
which is equivalent to:
dst=src1.p?src1:src2 if (src1.p ||src2.p)
dst.p=src1.p||src2.p
The usefulness of this optimization is evidenced in the code example of TABLE II, in which, if the phi instruction is used, then variable z1 is not required and may be replaced z. This results in a gain of one register and two instructions.

The present invention can be extended to sub-word predicates. In that case, a predicate bit is associated with each sub-word of a data register. The predicate register file is thus composed of multi-bit words, one bit per sub-word in a corresponding data register.

The present invention allows existing ISAs with partial or no predication support to be extended to support full predication. Rather than adding a predicate operand to instructions, predicated execution is achieved by adding a predicate bit to each operand, and the instruction predicate is evaluated as the logical AND of all the source operands predicates rather than being read from a register file. This implementation of full predication is thus referred to as operand predicate, as opposed to instruction predication, and the additional register bit is referred to as the operand predicate.

Although the present invention has been described in detail, those skilled in the art will understand that various changes, substitutions, variations, enhancements, nuances, gradations, lesser forms, alterations, revisions, improvements and knock-offs of the invention disclosed herein may be made without departing from the spirit and scope of the invention in its broadest form.

What is claimed is:

1. A predication mechanism comprising:
a plurality of operand registers each containing an operand;
a predicate register associated with each operand register and containing a predicate value, wherein each operand register and the associated predicate register share an address bus and are accessed concurrently in read and write modes; and
a controller allowing an instruction to complete execution only if a predicate value associated with every operand register containing a source operand for the instruction is true,
wherein the at least one operand register and the associated predicate register are controlled by the same read command signal and controlled by different write command signals.

2. The predication mechanism according to claim 1, wherein the operand registers comprise general purpose, floating point or address data registers and the predicate registers comprise a corresponding plurality of predicate registers each associated with one of the operand registers, wherein each time an operand register is accessed, an associated predicate register is concurrently accessed.

3. The predication mechanism according to claim 1, wherein the controller computes a predicate value based on one or more of a predicate value associated with an operand register containing a source operand, a type of an instruction executed, and a result of comparison of operand registers containing source operands, and then writes the computed predicate value to a predicate register associated with a destination operand register.

4. The predication mechanism according to claim 1, wherein the controller prevents a result of the instruction from being written to a destination operand register based on a predicate value associated with the result.

5. The predication mechanism according to claim 1, wherein the controller is adapted to handle results from execution of one or more of:
a phi instruction for selecting none or one of two source operands to write to a destination register based on predicate values associated with each source operand; and
a conditional move instruction for selectively writing a source operand to a destination register based on a predicate value associated with the source operand.

6. The predication mechanism according to claim 1, wherein the predicate value for a destination operand register is one of:
a logical AND lf the predicate values for the one or more source operand registers;
an exclusive OR (XOR) of the predicate values for the one or more source operand registers; and
a logical combination of the predicate values for the one or more source operand registers and a result of a comparison.

7. The predication mechanism according to claim 3, wherein the predicate value for the destination operand register is one of:
a logical AND of the predicate values for the one or more source operand registers;
an exclusive OR (XOR) of the predicate values for the one or more source operand registers; and
a logical combination of the predicate values for the one or more source operand registers and a result of a comparison.

8. A processor comprising:
a data register file including a plurality of operand registers containing an operand;
a predicate register associated with each operand register and containing a predicate value, wherein each operand register and the associated predicate register share an address bus and are accessed concurrently in read and write modes;
an arithmetic logic unit coupled to the data register file and an address bus; and a predicate arithmetic logic unit coupled to the predicate registers and the address bus, wherein, when the processor is operable, a single address bus is employed to concurrently access at least one of the operand registers and an associated predicate register, the processor allowing an instruction to complete execution only if a predicate value associated with every operand register containing a source operand for the instruction is true, wherein the at least one operand register and the associated predicated register are controlled by the same read command signal and controlled by different write command signals.

9. The processor according to claim 8, wherein, when the processor is operable, the predicate arithmetic logic unit computes a predicate value for a result of an instruction from one or more of an instruction type, a predicate value for at least one source operand for the instruction, and a result of a comparison performed by the arithmetic logic unit.

10. The processor according to claim 9, wherein, when the processor is operable, the arithmetic logic unit writes the result of the instruction to the data register file only if the predicate value computed by the predicate arithmetic logic unit is true.

11. The processor according to claim 8, wherein the operand registers comprise general purpose, floating point or address data registers and the predicate registers comprise a corresponding plurality of predicate registers each associated with one of the operand registers, and wherein, when the processor is operable, each operand register and associated predicate register may be selectively accessed concurrently by a single address.

12. The processor according to claim 8, wherein, when the processor is operable, the predicate arithmetic logic unit computes a predicate value for an instruction result from a logical AND of instruction source operand predicate values for selected instructions, a logical XOR of instruction source operand predicate values for a phi instruction, and a predefined logical combination of instruction source operand predicate values for a comparison instruction.

13. The processor according to claim 8, wherein the predicate arithmetic logic unit and the arithmetic logic unit, when the processor is operable, process operands for execution of one or more of:
 a phi instruction for selecting none or one of two source operands to write to a destination register based on predicate values associated with each source operands; and
 a conditional move instruction for selectively writing a source operand to a destination register based on a predicate value associated with the source operand.

14. The processor according to claim 9, wherein, when the processor is operable, the predicate arithmetic logic unit computes the predicate value for the result from predicate values for each source operand and the arithmetic logic unit writes the result of the instruction to the data register file only if the predicate values for all source operands are true.

15. A predication process comprising:
 storing an operand value in an operand register;
 storing an operand predicate value associated with the operand value in a predicate register associated with the operand register;
 accessing the operand register and the predicate register concurrently using a single address on a shared address bus, wherein the operand register and the associated predicated register are controlled by the same read command signal and controlled by different write command signals;
 writing a result of an instruction to a destination operand register using the result as a source operand only if the predicate value is true; and
 handling operands for execution of one or more of: a phi instruction to select none or one of two source operands to write to a destination register based on predicate values associated with each source operand; and a conditional move instruction to selectively write a source operand to a destination register based on a predicate value associated with the source operand.

16. The process according to claim 15, wherein the operand register comprises a plurality of general. purpose, floating point or address data registers.

17. The process according to claim 15, further comprising:
 each time one of a plurality of general purpose, floating point or address data registers is accessed, concurrently accessing an associated predicate register within a corresponding plurality of predicate registers each associated with one of the data registers.

18. The process according to claim 15, further comprising:
 computing the predicate value based on one or more of a predicate value associated with at least one operand register containing a source operand, a type of an instruction being executed, and a result of comparison of operand registers containing source operands.

19. The process according to claim 18, further comprising:
 writing the computed predicate value to a predicate register associated with a destination operand register.

20. The process according to claim 15, further comprising:
 preventing a result of the instruction from being written to a destination operand register based on a predicate value associated with the result.

* * * * *